(12) United States Patent
Zhao et al.

(10) Patent No.: US 12,217,124 B2
(45) Date of Patent: Feb. 4, 2025

(54) HANDHELD SCANNER AND SCANNING METHOD FOR HANDHELD SCANNER

(71) Applicant: SHINING 3D TECH CO., LTD., Zhejiang (CN)

(72) Inventors: Xiaobo Zhao, Zhejiang (CN); Wenbin Wang, Zhejiang (CN)

(73) Assignee: SHINING 3D TECH CO., LTD., Zhejiang (CN)

( * ) Notice: Subject to any disclaimer, the term of this patent is extended or adjusted under 35 U.S.C. 154(b) by 0 days.

(21) Appl. No.: 18/278,851

(22) PCT Filed: Feb. 25, 2022

(86) PCT No.: PCT/CN2022/078023
§ 371 (c)(1),
(2) Date: Aug. 25, 2023

(87) PCT Pub. No.: WO2022/179623
PCT Pub. Date: Sep. 1, 2022

(65) Prior Publication Data
US 2024/0127013 A1    Apr. 18, 2024

(30) Foreign Application Priority Data
Feb. 25, 2021   (CN) .......................... 202110212799.0

(51) Int. Cl.
*G06K 7/10* (2006.01)
*G06T 15/04* (2011.01)

(52) U.S. Cl.
CPC ..... *G06K 7/10881* (2013.01); *G06K 7/10831* (2013.01); *G06T 15/04* (2013.01);
(Continued)

(58) Field of Classification Search
CPC .......... G06K 7/10881; G06K 7/10831; G06K 2007/10485; G06K 2007/10524; G06T 15/04; G01B 11/2518; G01B 11/2513
See application file for complete search history.

(56) References Cited

U.S. PATENT DOCUMENTS

| 10,810,750 | B1 | 10/2020 | Wang |
| 2005/0018209 | A1* | 1/2005 | Lemelin ............. G01B 11/2545 356/604 |

(Continued)

FOREIGN PATENT DOCUMENTS

| CN | 204831219 U | 12/2015 |
| CN | 107111602 A | 8/2017 |

(Continued)

OTHER PUBLICATIONS

CN 111023970A—Multi-mode three-dimensional scanning method and system, 6 pages. (Year: 2024).*

(Continued)

*Primary Examiner* — Tuyen K Vo
(74) *Attorney, Agent, or Firm* — Samson G. Yu (57) ABSTRACT

The present disclosure discloses a handheld scanner and a scanning method for the handheld scanner. The handheld scanner includes a texture camera, a first black-and-white camera and a second black-and-white camera, where the first black-and-white camera and the second black-and-white camera are spaced apart from each other; and the handheld scanner further includes a laser projector, and the texture camera and the first black-and-white camera are respectively arranged at two sides of the laser projector. When a highly reflective or dark object is scanned, textures are obtained by the texture camera while laser scanning is performed; and after point cloud fusion is completed, texture images are screened and fused according to a shooting angle and the (Continued)

highlight degree of the image, so that the overall texture image of point cloud is obtained.

14 Claims, 4 Drawing Sheets

(52) U.S. Cl.
CPC .............. *G06K 2007/10485* (2013.01); *G06K 2007/10524* (2013.01)

(56) References Cited

U.S. PATENT DOCUMENTS

| | | | |
|---|---|---|---|
| 2006/0034548 A1 | 2/2006 | Pishdadian | |
| 2006/0202038 A1* | 9/2006 | Wang | G06K 7/10732 235/462.24 |
| 2008/0121713 A1* | 5/2008 | Steele | G06K 7/10851 235/462.13 |
| 2009/0080036 A1* | 3/2009 | Paterson | G06V 10/60 358/474 |
| 2011/0134225 A1 | 6/2011 | Saint-Pierre | |
| 2013/0100282 A1* | 4/2013 | Siercks | G01B 11/25 348/135 |
| 2017/0299379 A1* | 10/2017 | Luepke | H04N 23/00 |
| 2019/0113334 A1* | 4/2019 | Wolke | G01B 11/2545 |
| 2019/0249980 A1* | 8/2019 | Tahir | G01S 7/481 |
| 2019/0304150 A1* | 10/2019 | Zweigle | G06T 7/521 |
| 2020/0174125 A1* | 6/2020 | Fröhlich | G01S 17/89 |
| 2021/0044790 A1 | 2/2021 | Venkataraman | |
| 2021/0279436 A1* | 9/2021 | Barkan | G06K 7/10881 |
| 2021/0374978 A1* | 12/2021 | Döring | G06T 7/33 |
| 2022/0124253 A1* | 4/2022 | Ossig | G01B 11/25 |
| 2022/0383549 A1 | 12/2022 | Zheng | |

FOREIGN PATENT DOCUMENTS

| | | | |
|---|---|---|---|
| CN | 107680039 A | 2/2018 | |
| CN | 111023970 A | 4/2020 | |
| CN | 107680039 B | 7/2020 | |
| CN | 111982025 A | 11/2020 | |
| CN | 212539084 U | 2/2021 | |
| CN | 113011206 A | 6/2021 | |
| CN | 214225931 U | 9/2021 | |
| WO | WO-2014091306 A1 * | 6/2014 | .......... G01B 11/002 |
| WO | 2018072433 A1 | 4/2018 | |

OTHER PUBLICATIONS

CN 107680039A—White-light scanner-based point cloud splicing method and system, 6 pages. (Year: 2024).*

The search report of family EP application No. 22758987.6 issue on Jul. 16, 2024.

The English search report of CN application No. 2021102127990 issue on Nov. 12, 2024.

* cited by examiner

HANDHELD SCANNER AND SCANNING METHOD FOR HANDHELD SCANNER

This disclosure claims the priority to Chinese Patent Application No. 202110212799.0, entitled "Handheld Scanner and Scanning Method for Handheld Scanner", and filed with the Chinese Patent Office on Feb. 25, 2021, the entire contents of which are incorporated herein by reference.

TECHNICAL FIELD

The present disclosure relates to the technical field of three-dimensional model reconstruction, and particular relates to a handheld scanner and a scanning method for the handheld scanner.

BACKGROUND

At present, there are two main methods for scanning dark or reflective objects that are not allowed to undergo powder spraying treatment, such as scanning cultural relics. One is to use a laser scanner to acquire three-dimensional data, and then use a digital camera to perform subsequent color mapping; and the other one is laser color scanning on articulated arms. These two scanning methods are greatly limited in terms of real-time scanning and the breadth of scanning.

SUMMARY

This disclosure provides a handheld scanner and a scanning method for the handheld scanner to at least solve the problem of poor real-time performance of scanning methods in the prior art.

At least some of the embodiments of the present disclosure provide a handheld scanner, including a texture camera; a first black-and-white camera and a second black-and-white camera, where the first black-and-white camera and the second black-and-white camera are spaced apart from each other; and a laser projector, where the texture camera and the first black-and-white camera are respectively arranged at two sides of the laser projector.

Optionally, the handheld scanner further includes a speckle projector, and the speckle projector is spaced apart from the laser projector.

Optionally, the handheld scanner further includes a first scanning portion, the laser projector and the first black-and-white camera are arranged on the first scanning portion, and the laser projector is arranged adjacent to the first black-and-white camera.

Optionally, the handheld scanner further includes a second scanning portion, and the speckle projector and the second black-and-white camera are arranged on the second scanning portion.

Optionally, the handheld scanner further includes a handheld portion, and the first scanning portion and the second scanning portion are respectively arranged at two ends of the handheld portion.

Optionally, an emergence angle A is provided between an exit light path of the first black-and-white camera and an exit light path of the second black-and-white camera, and the emergence angle A is within a range of 5° to 20°.

Optionally, the handheld scanner further includes a plurality of first fill-in lamps, and the plurality of first fill-in lamps are arranged around the first black-and-white camera.

Optionally, the handheld scanner further includes a plurality of second fill-in lamps, the plurality of second fill-in lamps are arranged around the second black-and-white camera.

Optionally, the handheld scanner further includes a plurality of third fill-in lamps, and the plurality of third fill-in lamps are arranged around the texture camera.

Optionally, the handheld scanner further includes a third black-and-white camera, and the third black-and-white camera is spaced apart from the first black-and-white camera and the second black-and-white camera.

At least some of the embodiments of the present disclosure provide a scanning method for the handheld scanner, the scanning method is applied to any handheld scanner mentioned above. The scanning method includes: employing the laser projector to project laser light onto a surface of an object to be measured, and synchronously acquiring laser light patterns modulated by the surface of the object to be measured by using the first black-and-white camera and the second black-and-white camera, where the laser light patterns are configured to perform three-dimensional reconstruction on the object to be measured; stop employing the laser projector to project laser light onto the surface of the object to be measured, and acquiring a texture image of the surface of the object to be measured by using the texture camera, where the texture image is configured to perform texture reconstruction on the object to be measured; and performing point cloud reconstruction on the laser light patterns acquired by the first black-and-white camera and the second black-and-white camera based on the internal parameters and the external parameters of the first black-and-white camera and the second black-and-white camera, and mapping the point cloud by using the texture image to obtain a final three-dimensional scanned image.

Optionally, mapping the point cloud by using the texture image to obtain the final three-dimensional scanned image includes: determining a correspondence relationship between each pixel in the texture image and each point in the point cloud based on the internal parameters and the external parameters of the first black-and-white camera, the second black-and-white camera, and the texture camera; and mapping the point cloud to determine the final three-dimensional scanned image based on the correspondence relationship between each pixel in the texture image and each point in the point cloud.

Optionally, determining, based on the internal parameters and the external parameters of the first black-and-white camera, the second black-and-white camera, and the texture camera, the correspondence relationship between each pixel in the texture image and each point in the point cloud includes: determining, based on the internal parameters and external parameters of the first black-and-white camera, the second black-and-white camera and the texture camera, a correspondence relationship between the laser light patterns acquired by the first black-and-white camera and the second black-and-white camera and each pixels in the texture image acquired by the texture camera; and determining, based on the correspondence relationship between the laser light patterns and each pixel in the texture image, and the correspondence relationship between each pixel in the laser light patterns and each point in the point cloud, the correspondence relationship between each pixel in the texture image and each point in the point cloud.

Optionally, mapping, based on the correspondence relationship between each pixel in the texture image and each point in the point cloud, the point cloud to determine the final three-dimensional scanned image includes: splicing the point cloud of a current frame with the point cloud of a previous frame, and determining, based on the texture information about the texture image corresponding to the point cloud of the current frame and the texture information about the texture image corresponding to the point cloud of the previous frame, a first region of the point cloud of the current frame and a map image of the first region; and processing the point cloud of all frames based on the above steps to obtain the final three-dimensional scanned image.

Optionally, determining, based on the texture information about the texture image corresponding to the point cloud of the current frame and the texture information about the texture image corresponding to the point cloud of the previous frame, the first region of the point cloud of the current frame and the map image of the first region includes: determining, based on the grayscale changes in the texture image corresponding to the point cloud of the current frame and the texture image corresponding to the point cloud of the previous frame, the first region of the point cloud of the current frame, where the grayscale change in the first region satisfies preset conditions; comparing a plurality of texture images corresponding to the first region of the point cloud of the current frame to determine a target texture image obtained by performing front-view shooting on the corresponding position of the object to be measured in the first region; and mapping the first region by using the target texture image to determine the map image of the first region.

Optionally, a time interval between acquiring the laser light patterns and acquiring the texture image is lower than a preset threshold via a circuit design in the handheld scanner.

At least some of the embodiments of the present disclosure provide a scanning method for the handheld scanner, the scanning method is applied to any handheld scanner mentioned above. The scanning method includes: step S1: employing the speckle projector to project a speckle pattern onto a surface of an object to be measured, and synchronously acquiring a target speckle pattern modulated by the surface of the object to be measured by using the first black-and-white camera and the second black-and-white camera, where the target speckle pattern is configured to perform three-dimensional reconstruction on the object to be measured; step S2: stop employing the speckle projector to project the speckle pattern onto the surface of the object to be measured, and acquiring a texture image of the surface of the object to be measured by using the texture camera, where the texture image is configured to perform texture reconstruction on the object to be measured; and step S3: performing, based on the internal parameters and the external parameters of the first black-and-white camera and the second black-and-white camera, point cloud reconstruction on the target speckle pattern acquired by the first black-and-white camera and the second black-and-white camera, and mapping the point cloud by using the texture image to obtain a final three-dimensional scanned image.

Optionally, the step S1 and the step S2 are alternately executed in the scanning method; and alternatively, the step S1 in the scanning method is executed multiple times, followed by the step S2.

At least some of the embodiments of the present disclosure provide a scanning method for the handheld scanner, the scanning method is applied to any handheld scanner mentioned above. The scanning method includes: employing the speckle projector to project a speckle pattern onto a surface of an object to be measured, and synchronously acquiring a target speckle pattern modulated by the surface of the object to be measured by using the first black-and-white camera and the second black-and-white camera, where the target speckle pattern is configured to perform three-dimensional reconstruction on the object to be measured; stop employing the speckle projector to project the speckle pattern onto the surface of the object to be measured, employing the laser projector to project laser light onto the surface of the object to be measured, and synchronously acquiring a laser light pattern modulated by the surface of the object to be measured by using the first black-and-white camera and the second black-and-white camera, where the laser light pattern is configured to perform three-dimensional reconstruction on the object to be measured; stop employing the laser projector to project laser light onto the surface of the object to be measured, and acquiring a texture image of the surface of the object to be measured by using the texture camera, where the texture image is configured to perform texture reconstruction on the object to be measured; performing, based on the internal parameters and the external parameters of the first black-and-white camera and the second black-and-white camera, point cloud reconstruction on the target speckle pattern acquired by the first black-and-white camera and the second black-and-white camera, and performing point cloud reconstruction on the laser light pattern acquired by the first black-and-white camera and the second black-and-white camera; and screening a first point cloud and a second point cloud, and mapping the target point cloud by employing the texture image to obtain a final three-dimensional scanned image, wherein the first point cloud is obtained by performing point cloud reconstruction on the target speckle pattern, the second point cloud is obtained by performing point cloud reconstruction on the laser light pattern.

According to the embodiments of the present disclosure, the handheld scanner includes the texture camera, the first black-and-white camera and the second black-and-white camera, where the first black-and-white camera and the second black-and-white camera are spaced apart from each other; and the handheld scanner further includes the laser projector, and the texture camera and the first black-and-white camera are respectively arranged at the two sides of the laser projector. When a highly reflective or dark object is scanned, textures are obtained by the texture camera while laser scanning is performed; and after the point cloud fusion is completed through a three-dimensional point cloud fusion technology, texture images are screened and fused according to a shooting angle and the highlight degree of the image, so that the overall texture image of point cloud is obtained. In this way, the problem of successively using laser scanning and digital cameras for subsequent color mapping in the prior art can be avoided, and the real-time performance of scanning can be improved.

BRIEF DESCRIPTION OF THE DRAWINGS

The accompanying drawings described herein are used to provide further understanding of the present disclosure, and constitute a part of this disclosure. The exemplary embodiments of the present disclosure and the descriptions thereof are used to explain the present disclosure, and do not constitute improper limitations to the present disclosure. In figures.

The following reference numerals on the drawings are described below:

10. texture camera; 21. first black-and-white camera; 22. second black-and-white camera; 23. third black-and-white camera; 30. laser projector; 40. speckle projector; 51. first fill-in lamp; 52. second fill-in lamp; 53. third fill-in lamp; 60. first scanning portion; 70. second scanning portion; and 80. handheld portion.

DETAILED DESCRIPTION

In order to enable those skilled in the art to better understand the solutions of the present disclosure, the solutions in the embodiments of the present disclosure will be described clearly and completely hereinafter with reference to the accompanying drawings in the embodiments of the present disclosure. Apparently, the described embodiments are only a part rather than all of the embodiments of the present disclosure. Based on the embodiments of the present disclosure, all other embodiments obtained by those of ordinary skill in the art without making creative efforts shall fall within the protection scope of the present disclosure.

It should be noted that the terms "first", "second" and the like in the Description and Claims of the present disclosure and the above-mentioned accompanying drawings are used to distinguish similar objects, and are not necessarily used to describe a particular order or sequence. It should be understood that the data used in this way can be interchanged under appropriate circumstances, so that the embodiments of the present disclosure described herein can be implemented in a sequence other than those illustrated or described herein. In addition, the terms "including" and "having" as well as any variations thereof are intended to cover non-exclusive inclusion. For example, a system, product, or device containing a series of units need not be limited to those clearly listed, but may include other units that are not clearly listed or are inherent to these products or devices.

Figure 1:
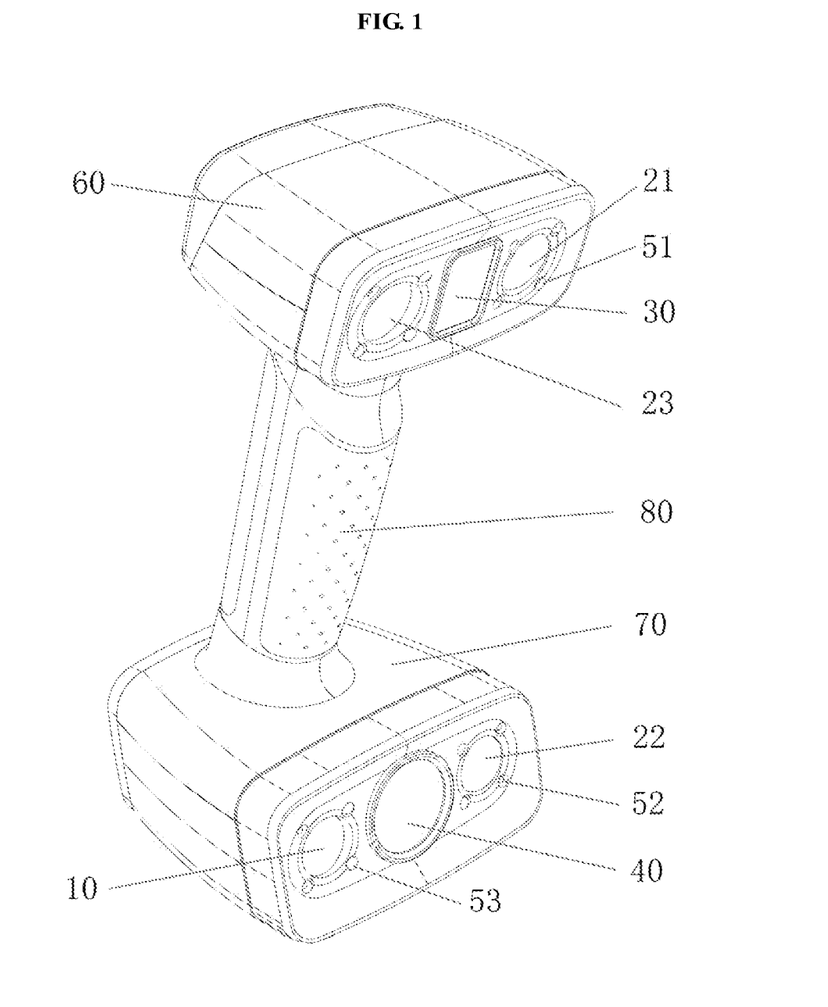
FIG. 1 is a schematic diagram of a handheld scanner provided by the embodiments according to this disclosure.

According to the first embodiment of the present disclosure, provided is a handheld scanner. As shown in FIG. 1, the handheld scanner according to the embodiment of the present disclosure includes a texture camera 10, a first black-and-white camera 21 and a second black-and-white camera 22, where the first black-and-white camera 21 and the second black-and-white camera 22 are spaced apart from each other; and the handheld scanner further includes a laser projector 30, and the texture camera 10 and the first black-and-white camera 21 are respectively arranged at the two sides of the laser projector 30.

In this embodiment, when a highly reflective or dark object is scanned, multiple textures are obtained by the texture camera while laser scanning is performed; and after the point cloud fusion is completed through a three-dimensional point cloud fusion technology, texture images are screened and fused according to a shooting angle and the highlight degree of the image, so that the overall texture image of point cloud is obtained. In this way, the problem of successively using laser scanning and digital cameras for subsequent color mapping in the prior art can be avoided, and the real-time performance of scanning can be improved. This scanning mode is a first scanning mode.

In an embodiment, the shooting angle is obtained based on the camera RT obtained after scanning and splicing and the relationship between the texture camera and the black-and-white cameras during calibration, while the highlight degree is obtained through the grayscale information of an algorithm. When the texture images are screened and fused, in response to a large jump being exist in the grayscale changes of the same region on different images, it may be a highlight region, and then whether it is shooting right at the object or not is determined in combination of the RT corresponding to this image, so that the image of which angle of view should be used for mapping in the highlight region is selected.

According to the second embodiment of the present disclosure, provided is a handheld scanner. The handheld scanner includes texture camera 10, first black-and-white camera 21 and second black-and-white camera 22, where the first black-and-white camera 21 and the second black-and-white camera 22 are spaced apart from each other; and the handheld scanner further includes a laser projector 30, and the texture camera 10 and the first black-and-white camera 21 are respectively arranged at the two sides of the laser projector 30. In addition, a speckle projector 40 is also included, and the speckle projector 40 and the laser projector 30 are spaced apart from each other.

The laser projector, the first black-and-white camera and the second black-and-white camera construct a binocular stereo vision system. The handheld scanner includes a computing module, in which the internal parameters and the external parameters of the laser projector, the first black-and-white camera, and the second black-and-white camera, and the internal parameters and the external parameters of the laser projector, the texture camera, and the binocular stereo vision system are pre-stored.

When the handheld scanner performs scanning, the speckle projector 40 and the texture camera 10 are configured to perform three-dimensional scanning and texture scanning on an object to be scanned, and this scanning mode is a second scanning mode. Then, for the parts that need to be presented in detail or cannot be obtained due to dark colors or reflections, supplementary scanning is performed in the mode as described in the first embodiment, that is, the handheld scanner obtains the texture by the texture camera while performing laser scanning. The algorithm screens three-dimensional point cloud based on the obtained data, and the point cloud of the laser is retained first. After the point cloud fusion is completed, texture images obtained in the two scanning modes are screened and fused according to a shooting angle and the highlight degree of the images, so that the overall texture image of the point cloud is obtained.

In an embodiment, in the process of screening and fusion, fusion is performed after screening. During screening, the screening is determined according to the degree of grayscale edge skipping and whether the image is facing the object. In the process of fusion between the point cloud obtained by the speckle mode and the point cloud obtained by the laser mode, the coordinate systems of the two scanning modes need to be unified. The unifying of the coordinate systems may be based on marker points or features. When regions overlap, the point cloud obtained by the laser mode is preferred. The point cloud and color images obtained by multiple scanning modes are fused and output, which ensures that the three-dimensional data and color information can be acquired directly and quickly without performing powder spraying treatment on dark or reflective objects.

According to the third embodiment of the present disclosure, provided is a handheld scanner. The handheld scanner includes a first scanning portion 60, a second scanning portion 70, and a handheld portion 80, where the first scanning portion 60 and the second scanning portion 70 are respectively arranged at two ends of the handheld portion 80.

The laser projector 30 and the first black-and-white camera 21 are arranged on the first scanning portion 60, the laser projector 30 is arranged adjacent to the first black-and-white camera 21, and the speckle projector 40 and the second black-and-white camera 22 are arranged on the second scanning portion 70.

As shown in FIG. 1, a main body of the handheld portion 80 is cylindrical, and the first scanning portion 60 and the second scanning portion 70 are respectively connected to two ends of the handheld portion. The laser projector 30 is arranged on an end face of one end of the first scanning portion 60, and the first black-and-white camera 21 is arranged at one side of the laser projector 30. The speckle projector 40 is arranged on an end face of one end of the second scanning portion 70, a second black-and-white camera 20 is arranged at on one side of the speckle projector 40, and the texture camera 10 is arranged at the other side of the speckle projector 40.

The texture camera 10 and the second black-and-white camera 22 are respectively arranged on both sides of the speckle projector 40, and the shooting angles are relatively close, which can increase the overlapping region of the two cameras, and can maximize the coloring of the point cloud data (that is, adding textures). In addition, the first black-and-white camera 21 and the second black-and-white camera 22 are respectively arranged on the first scanning portion 60 and the second scanning portion 70, and there is the handheld portion 80 between the first scanning portion 60 and the second scanning portion 70, so that there is a certain interval between the first black-and-white camera 21 and the second black-and-white camera 22, and the accuracy of the scanned data can be improved accordingly. Preferably, there is an emergence angle A between an exit light path of the first black-and-white camera 21 and an exit light path of the second black-and-white camera 22, and the emergence angle A is within a range of 5° to 20°, which can further improve the accuracy of the scanned data.

In the fourth embodiment of the present disclosure, the handheld scanner further includes fill-in lamps.

In an embodiment, the handheld scanner further includes a plurality of first fill-in lamps 51, the plurality of first fill-in lamps 51 are arranged around the first black-and-white camera 21. The plurality of first fill-in lamps 51 are arranged around the first black-and-white camera 21 for the purpose of allowing a mark point to be reflected on the camera more clearly when the mark point made of the reflective material is illuminated, thereby minimizing interference from other environments, highlighting the mark point, and creating convenient conditions for subsequent recognition. In this embodiment, the handheld scanner further includes a plurality of second fill-in lamps 52, the plurality of second fill-in lamps 52 are arranged around the second black-and-white camera 22.

Preferably, the handheld scanner further includes a plurality of third fill-in lamps 53, the plurality of third fill-in lamps 53 are arranged around the texture camera. The arrangement of the fill-in lamps around the texture camera can eliminate the interference of ambient light and better reflect the original color information of an object.

In the fifth embodiment of the present disclosure, the scanner includes the first scanning portion 60, the second scanning portion 70, and the handheld portion 80, where the first scanning portion 60 and the second scanning portion 70 are respectively arranged at the two ends of the handheld portion 80. The scanner includes the texture camera 10, the first black-and-white camera 21 and the second black-and-white camera 22, and the first black-and-white camera 21 and the second black-and-white camera 22 are spaced apart from each other. The handheld scanner further includes the laser projector 30, and the texture camera 10 and the first black-and-white camera 21 are respectively arranged at the two sides of the laser projector 30. The handheld scanner further includes the speckle projector 40, and the speckle projector 40 and the laser projector 30 are spaced apart from each other. The laser projector 30 and the first black-and-white camera 21 are arranged on the first scanning portion 60, and the laser projector 30 is arranged adjacent to the first black-and-white camera 21. The speckle projector 40 and the second black-and-white camera 22 are arranged on the second scanning portion 70.

Preferably, the handheld scanner further includes a third black-and-white camera 23 arranged on the first scanning portion 60, and the third black-and-white camera 23 and the first black-and-white camera 21 are respectively arranged on both sides of the laser projector 30. Due to the relatively dispersed arrangement of the three black-and-white cameras, the recognition accuracy of the scanner for the three-dimensional object can be further improved.

The handheld scanner provided by this disclosure can obtain color information in real time while laser scanning, and can perform data fusion on data scanned in different modes, thereby greatly expanding the disclosure scope of the scanner.

Figure 2:
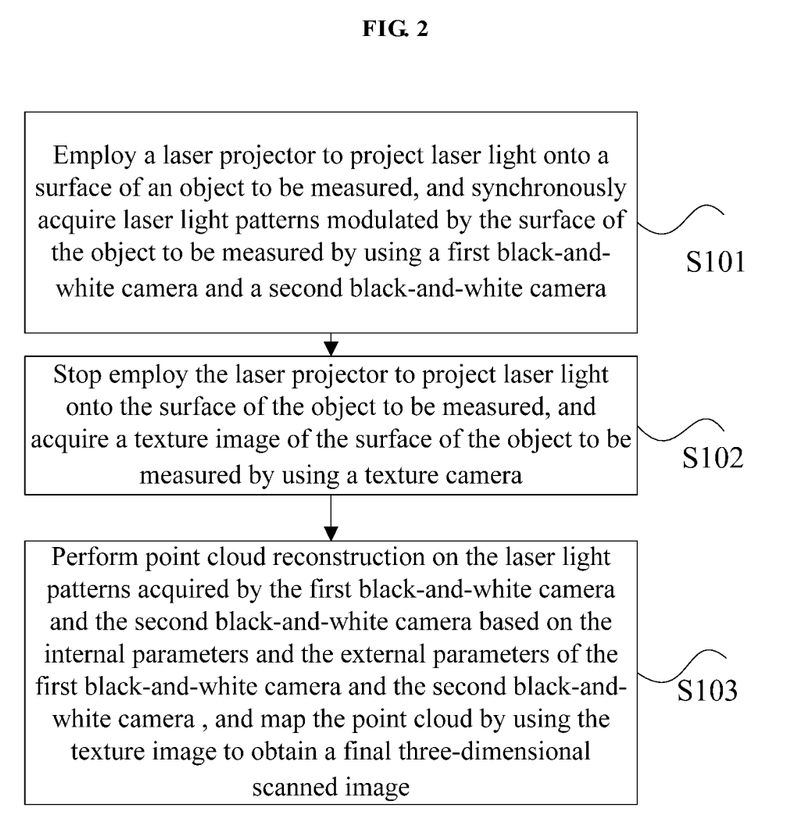
FIG. 2 is a flowchart I of a scanning method for a handheld scanner provided by the embodiments according to this disclosure.

In the fifth embodiment of the present disclosure, provided is a scanning method for the handheld scanner, the scanning method is applied to the handheld scanner described in any one of the above embodiments. As shown in FIG. 2, the scanning method includes:

at step S101: employing the laser projector to project laser light onto a surface of an object to be measured, and synchronously acquiring laser light patterns modulated by the surface of the object to be measured by using the first black-and-white camera and the second black-and-white camera, where the laser light patterns are configured to perform three-dimensional reconstruction on the object to be measured;

at step S102: stop employing the laser projector to project laser light onto the surface of the object to be measured, and acquiring a texture image of the surface of the object to be measured by using the texture camera, where the texture image is configured to perform texture reconstruction on the object to be measured; and at step S103: performing, based on the internal parameters and the external parameters of the first black-and-white camera and the second black-and-white camera, point cloud reconstruction on the laser light patterns acquired by the first black-and-white camera and the second black-and-white camera, and mapping the point cloud by using the texture image to obtain a final three-dimensional scanned image.

In an embodiment, mapping the point cloud by using the texture image to obtain the final three-dimensional scanned image includes: at step S1031: determining, based on the internal parameters and the external parameters of the first black-and-white camera, the second black-and-white camera, and the texture camera, a correspondence relationship between each pixel in the texture image and each point in the point cloud; and at step S1032: mapping, based on the correspondence relationship between each pixel in the texture image and each point in the point cloud, the point cloud to determine the final three-dimensional scanned image.

Further, determining, based on the internal parameters and the external parameters of the first black-and-white camera, the second black-and-white camera, and the texture camera, the correspondence relationship between each pixel in the texture image and each point in the point cloud is achieved by the following steps: first, determining, based on the internal parameters and the external parameters of the first black-and-white camera, the second black-and-white camera, and the texture camera, a correspondence relationship between the laser light patterns acquired by the first black-and-white camera and the second black-and-white camera and each pixel in the texture image acquired by the texture camera; and then, determining, based on the correspondence relationship between the laser light patterns and each pixel in the texture image, and the correspondence relationship between each pixel in the laser light patterns and each point in the point cloud, the correspondence relationship between each pixel in the texture image and each point in the point cloud.

That is, based on the internal parameters and the external parameters of the black-and-white cameras and the texture camera, the correspondence relationship between the successively shot laser light patterns and each pixel in the texture image is determined; and based on the correspondence relationship between the laser light patterns and each pixel in the texture image, and the correspondence relationship between each pixel in the laser light patterns and each point in the point cloud, the correspondence relationship between each point in the point cloud and each pixel in the texture image is determined.

Further, mapping, based on the correspondence relationship between each pixel in the texture image and each point in the point cloud, the point cloud to determine the final three-dimensional scanned image is achieved by the following steps: splicing the point cloud of a current frame with the point cloud of a previous frame, and determining, based on the texture information about the texture image corresponding to the point cloud of the current frame and the texture information about the texture image corresponding to the point cloud of the previous frame, a first region of the point cloud of the current frame and a map image of the first region; and processing the point cloud of all frames based on the above steps to obtain the final three-dimensional scanned image.

Wherein, determining, based on the texture information about the texture image corresponding to the point cloud of the current frame and the texture information about the texture image corresponding to the point cloud of the previous frame, the first region of the point cloud of the current frame refers to determining, based on the grayscale changes in the texture image corresponding to the point cloud of the current frame and the texture image corresponding to the point cloud of the previous frame, the first region of the point cloud of the current frame, where the grayscale change in the first region satisfies preset conditions.

Wherein, determining, based on the texture information about the texture image corresponding to the point cloud of the current frame and the texture information about the texture image corresponding to the point cloud of the previous frame, the map image of the first region refers to comparing a plurality of texture images corresponding to the first region of the point cloud of the current frame, and determining a target texture image obtained by performing front-view shooting on the corresponding position of the object to be measured in the first region; and mapping the first region by using the target texture image to obtain the map image of the first region.

The texture map of the point cloud and the texture fusion map between the multi-frame point cloud can be scanned and processed in real time, or can be processed after the scanning is completed, that is, each frame of texture image can be obtained for texture mapping, and texture fusion mapping can be performed on the previous frame of texture image, or the texture fusion mapping can be carried out at once after a plurality of frames of texture images are obtained.

It should be noted that: in response to perform the texture fusion mapping at once after a plurality of frames of texture images are obtained, the point clouds of the previous and subsequent frames have been spliced, and co-located points in the point cloud of the current frame correspond to both the texture information about the corresponding pixels in the texture image of the previous frame and the texture information about the corresponding pixels in the texture image of the subsequent frame; and in this case, "determining, based on the grayscale changes in the texture image corresponding to the point cloud of the current frame and the texture image corresponding to the point cloud of the previous frame, the first region of the point cloud of the current frame" described above may be: determining, based on the grayscale changes in the texture image corresponding to the point cloud of the current frame and the texture image corresponding to the point cloud of the previous frame and the texture image corresponding to the point cloud of the subsequent frame, the first region of the point cloud of the current frame.

For example, when there is a large jump in the grayscale changes on the texture image, the jump region is most likely to be a highlight region. In this case, a rotation translation matrix (i.e., RT) corresponding to the texture image is combined to determine whether the texture image is obtained by shooting right at the object, and to further determine whether to use the texture image to map the highlight region. Preferably, a plurality of texture images corresponding to the highlight region (co-located points) can also be selected for comparison, so that the image of which angle of view should be used for mapping in the highlight region is selected.

In addition, it should be noted that a time interval between acquiring the laser light patterns modulated by the surface of the object to be measured by using the first black-and-white camera and the second black-and-white camera and acquiring the texture image of the surface of the object to be measured by using the texture camera is lower than a preset threshold via a circuit design in the handheld scanner. That is to say, in conventional technology, it is difficult to ensure synchronous acquisition of laser data. However, the present disclosure achieves the completion of laser acquisition and texture acquisition in a very small time difference through circuit design and exposure parameter optimization, thus solving the difficulties of the prior art.

Finally, the scanning method for the handheld scanner provided in this embodiment is explained: the scanning method provided in this embodiment is the laser scanning mode of the handheld scanner, which mainly works as follows: a laser projects a laser light pattern onto a surface of the object to be measured, the first black-and-white camera and the second black-and-white camera synchronously acquire laser light patterns modulated by the surface of the object to be measured and transmit the laser light patterns to a computer for three-dimensional reconstruction;

the laser stops working, and the texture camera acquires a texture image of the surface of the object to be measured and transmits the texture image to the computer for texture reconstruction; the laser light patterns acquired by the first black-and-white camera and the second black-and-white camera are configured to perform point cloud reconstruction based on preset the internal parameters and the external parameters of the two black-and-white cameras; and finally, the point cloud is mapped by using the texture image to obtain the final three-dimensional scanned image.

Figure 3:
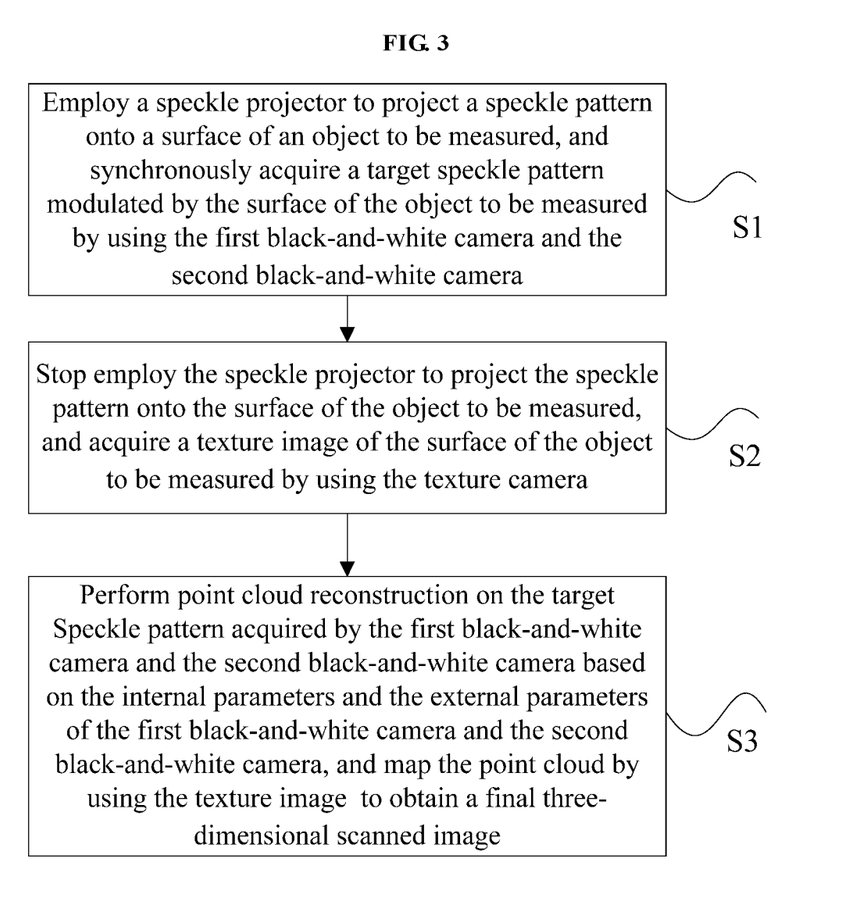
FIG. 3 is a flowchart II of a scanning method for a handheld scanner provided by the embodiments according to this disclosure.

In the sixth embodiment of the present disclosure, provided is a scanning method for the handheld scanner, the scanning method is applied to the handheld scanner described in any one of the above embodiments. As shown in FIG. 3, the scanning method includes:

at step S1: employing the speckle projector to project a speckle pattern onto a surface of an object to be measured, and synchronously acquiring a target speckle pattern modulated by the surface of the object to be measured by using the first black-and-white camera and the second black-and-white camera, where the target speckle pattern is configured to perform three-dimensional reconstruction on the object to be measured;

at step S2: stop employing the speckle projector to project the speckle pattern onto the surface of the object to be measured, and acquiring a texture image of the surface of the object to be measured by using the texture camera, where the texture image is configured to perform texture reconstruction on the object to be measured; and at step S3: performing, based on the internal parameters and the external parameters of the first black-and-white camera and the second black-and-white camera, point cloud reconstruction on the target speckle pattern acquired by the first black-and-white camera and the second black-and-white camera, and mapping the point cloud by using the texture image to obtain a final three-dimensional scanned image.

It should be noted that in this embodiment, the step S1 and the step S2 are alternately executed in the scanning method; and alternatively, in this embodiment, the step S1 in the scanning method is executed multiple times, followed by the step S2.

Finally, the scanning method for the handheld scanner provided in this embodiment is explained: the scanning method provided in this embodiment is the speckle scanning mode of the handheld scanner, which mainly works as follows: the first black-and-white camera and the second black-and-white camera synchronously acquire the speckle pattern modulated by the surface of the object to be measured and transmit the speckle pattern to a computer for three-dimensional reconstruction; the speckle projector stops working, and the texture camera acquires the texture image of the surface of the object to be measured and transmits the texture image to the computer for texture reconstruction (it is worth emphasizing that in the speckle scanning mode, you can obtain a speckle pattern and then obtain a texture image, or you can obtain several speckle patterns and then obtain a texture image); the speckle patterns acquired by the first black-and-white camera and the second black-and-white camera are configured to perform point cloud reconstruction based on preset the internal parameters and the external parameters of the two black-and-white cameras; and finally, the point cloud is mapped by using the texture image to obtain the final three-dimensional scanned image.

Figure 4:
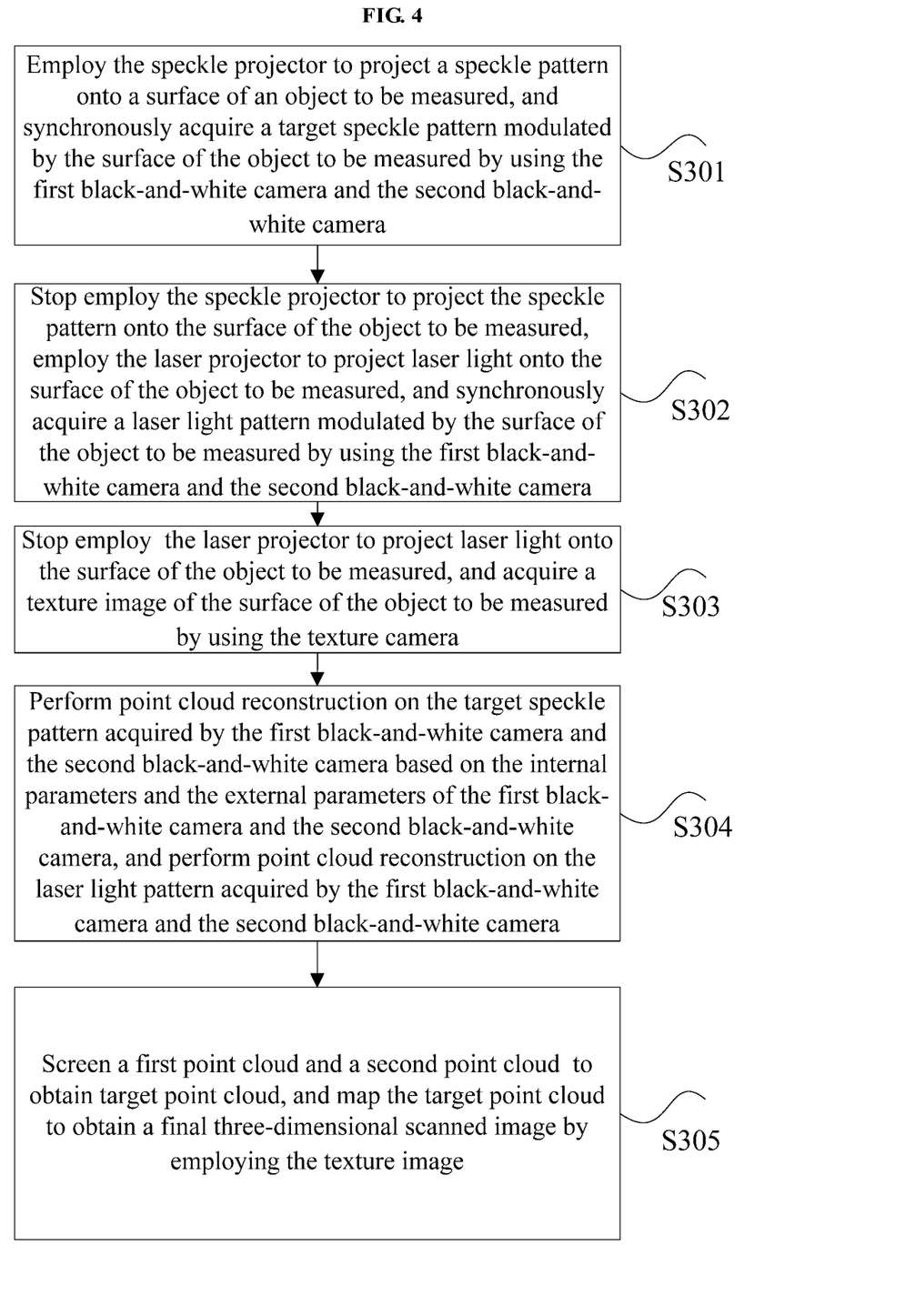
FIG. 4 is a flowchart III of a scanning method for a handheld scanner provided by the embodiments according to this disclosure.

In the seventh embodiment of the present disclosure, provided is a scanning method for the handheld scanner, the scanning method is applied to the handheld scanner described in any one of the above embodiments. As shown in FIG. 4, the scanning method includes:

at step S301, employing the speckle projector to project a speckle pattern onto a surface of an object to be measured, and synchronously acquiring a target speckle pattern modulated by the surface of the object to be measured by using the first black-and-white camera and the second black-and-white camera, where the target speckle pattern is configured to perform three-dimensional reconstruction on the object to be measured;

at step S302, stop employing the speckle projector to project the speckle pattern onto the surface of the object to be measured, employing the laser projector to project laser light onto the surface of the object to be measured, and synchronously acquiring a laser light pattern modulated by the surface of the object to be measured by using the first black-and-white camera and the second black-and-white camera, where the laser light pattern is configured to perform three-dimensional reconstruction on the object to be measured;

at step S303, stop employing the laser projector to project laser light onto the surface of the object to be measured, and acquiring a texture image of the surface of the object to be measured by using the texture camera, where the texture image is configured to perform texture reconstruction on the object to be measured;

at step S304, performing, based on the internal parameters and the external parameters of the first black-and-white camera and the second black-and-white camera, point cloud reconstruction on the target speckle pattern acquired by the first black-and-white camera and the second black-and-white camera, and performing point cloud reconstruction on the laser light pattern acquired by the first black-and-white camera and the second black-and-white camera;

at step S305, screening a first point cloud and a second point cloud to obtain a target point cloud, and mapping the target point cloud by employing the texture image to obtain a final three-dimensional scanned image, wherein the first point cloud is obtained by performing point cloud reconstruction on the target speckle pattern, the second point cloud is obtained by performing point cloud reconstruction on the laser light pattern.

Finally, the scanning method for the handheld scanner provided in this embodiment is explained: the scanning method provided in this embodiment is a combined mode of laser scanning and speckle scanning of the handheld scanner.

In the eighth embodiment of the present disclosure, the disclosure of the handheld scanner described in any of the above embodiments is illustrated as an example:

The handheld scanner has at least two scanning modes, and laser scanning and speckle scanning provided herein are taken as examples. The handheld scanner is composed of at least two black-and-white cameras and a texture camera, and a corresponding ring-shaped fill-in lamp group, laser and a speckle projector.

A first speckle scanning mode: the speckle projector, two black-and-white cameras, a texture camera and corresponding fill-in lamps.

A second laser scanning mode: the laser projector, two black-and-white cameras, the texture camera and corresponding fill-in lamps.

The first operation process: the scanner is handheld, the first speckle scanning mode is selected for three-dimensional and texture scanning, and then the second laser scanning mode is configured to perform supplementary scanning on the parts that need to be presented in detail or cannot be obtained due to dark colors and reflections. The algorithm screens three-dimensional point cloud based on the obtained data, and the point cloud acquired by laser scanning is retained first. After the point cloud fusion is completed, texture images obtained in the first and second scanning modes are screened and fused according to a shooting angle and the highlight degree of the images, so that the overall texture image of the point cloud is obtained.

The second operation process: the scanner is handheld, the second mode is directly used for scanning a highly reflective or dark object while acquiring textures. After the point cloud fusion is completed, texture images are screened and fused according to a shooting angle and the highlight degree of the images, so that the overall texture image of the point cloud is obtained.

In this case, it can be seen that the handheld scanner in this embodiment can achieve the following technical effects: 1. the color information of the corresponding point cloud can be obtained in real time during laser scanning; and 2. the point cloud and color texture images obtained by multiple scanning modes are fused and output, which ensures that the three-dimensional data and color information can be acquired directly and quickly without performing powder spraying treatment on dark or reflective objects.

In the above embodiments of the present disclosure, the speckle projector projects speckle patterns, the laser projector projects laser, and preferably, the laser projector projects laser stripe patterns.

The sequence numbers of the above-mentioned embodiments of the present disclosure are only for description, and do not represent the advantages and disadvantages of the embodiments.

In the above-mentioned embodiments of the present disclosure, the description of each embodiment has its own focus. For parts that are not described in detail in a certain embodiment, reference may be made to related descriptions of other embodiments.

The foregoing descriptions are merely exemplary embodiments of the present disclosure. It should be pointed out that for those of ordinary skill in the art, some improvements and embellishments without departing from the principle of the present disclosure should also be regarded as the protection scope of the present disclosure.

What is claimed is:

1. A handheld scanner, comprising:
    a texture camera (10);
    a first black-and-white camera (21) and a second black-and-white camera (22), the first black-and-white camera (21) and the second black-and-white camera (22) being spaced apart from each other;
    a laser projector (30), the texture camera (10) and the first black-and-white camera (21) being respectively arranged at two sides of the laser projector (30);
    wherein the handheld scanner is configured to perform following steps:
    employing the laser projector (30) to project laser light onto a surface of an object to be measured, and synchronously acquiring laser light patterns modulated by the surface of the object to be measured by using the first black-and-white camera (21) and the second black-and-white camera (22), wherein the laser light patterns are configured to perform three-dimensional reconstruction on the object to be measured;
    stop employing the laser projector (30) to project laser light onto the surface of the object to be measured, and acquiring a texture image of the surface of the object to be measured by using the texture camera (10), wherein the texture image is configured to perform texture reconstruction on the object to be measured;
    performing point cloud reconstruction on the laser light patterns acquired by the first black-and-white camera (21) and the second black-and-white camera (22) based on the internal parameters and the external parameters of the first black-and-white camera (21) and the second black-and-white camera (22), and mapping the point cloud by using the texture image to obtain a final three-dimensional scanned image;
    wherein a time interval between acquiring the laser light patterns and acquiring the texture image is lower than a preset threshold via a circuit design in the handheld scanner.

2. The handheld scanner as claimed in claim 1, further comprising:
    a speckle projector (40), the speckle projector (40) and the laser projector (30) being spaced apart from each other.

3. The handheld scanner as claimed in claim 2, further comprising at least one of the following scanning portions:
    a first scanning portion (60), the laser projector (30) and the first black-and-white camera (21) being arranged on the first scanning portion (60), and the laser projector (30) being arranged adjacent to the first black-and-white camera (21);
    a second scanning portion (70), the speckle projector (40) and the second black-and-white camera (22) being arranged on the second scanning portion (70);
    in response to the handheld scanner comprises the first scanning portion (60) and the second scanning portion (70), the handheld scanner also comprises:
    a handheld portion (80), wherein the first scanning portion (60) and the second scanning portion (70) are respectively arranged at two ends of the handheld portion (80).

4. A scanning method for the handheld scanner, wherein the scanning method is applied to the handheld scanner according to claim 2, and the scanning method comprising:
    step S1: employing the speckle projector (40) to project a speckle pattern onto a surface of an object to be measured, and synchronously acquiring a target speckle pattern modulated by the surface of the object to be measured by using the first black-and-white camera (21) and the second black-and-white camera (22) wherein the target speckle pattern is configured to perform three-dimensional reconstruction on the object to be measured;
    step S2: stop employing the speckle projector (40) to project the speckle pattern onto the surface of the object to be measured, and acquiring a texture image of the surface of the object to be measured by using the texture camera (10), wherein the texture image is configured to perform texture reconstruction on the object to be measured;
    step S3: performing point cloud reconstruction on the target speckle pattern acquired by the first black-and-white camera (21) and the second black-and-white camera (22) based on the internal parameters and the external parameters of the first black-and-white camera (21) and the second black-and-white camera (22), and mapping the point cloud by using the texture image to obtain a final three-dimensional scanned image.

5. The scanning method as claimed in claim 4, wherein the step S1 and the step S2 are alternately executed in the scanning method; and alternatively, the step S1 in the scanning method is executed multiple times, followed by the step S2.

6. A scanning method for the handheld scanner, wherein the scanning method is applied to the handheld scanner according to claim 2, and the scanning method comprising:
employing the speckle projector (40) to project a speckle pattern onto a surface of an object to be measured, and synchronously acquiring a target speckle pattern modulated by the surface of the object to be measured by using the first black-and-white camera (21) and the second black-and-white camera (22), wherein the target speckle pattern is configured to perform three-dimensional reconstruction on the object to be measured;
stop employing the speckle projector (40) to project the speckle pattern onto the surface of the object to be measured, employing the laser projector (30) to project laser light onto the surface of the object to be measured, and synchronously acquiring a laser light pattern modulated by the surface of the object to be measured by using the first black-and-white camera (21) and the second black-and-white camera (22), wherein the laser light pattern is configured to perform three-dimensional reconstruction on the object to be measured;
stop employing the laser projector (30) to project laser light onto the surface of the object to be measured, and acquiring a texture image of the surface of the object to be measured by using the texture camera (10), wherein the texture image is configured to perform texture reconstruction on the object to be measured;
performing point cloud reconstruction on the target speckle pattern acquired by the first black-and-white camera (21) and the second black-and-white camera (22) based on the internal parameters and the external parameters of the first black-and-white camera (21) and the second black-and-white camera (22), and performing point cloud reconstruction on the laser light pattern acquired by the first black-and-white camera (21) and the second black-and-white camera (22);
screening a first point cloud and a second point cloud to obtain a target point cloud, and mapping the target point cloud by employing the texture image to obtain a final three-dimensional scanned image, wherein the first point cloud is obtained by performing point cloud reconstruction on the target speckle pattern, the second point cloud is obtained by performing point cloud reconstruction on the laser light pattern.

7. The handheld scanner as claimed in claim 1, an emergence angle A is provided between an exit light path of the first black-and-white camera (21) and an exit light path of the second black-and-white camera (22), and the emergence angle A is within a range of 5° to 20°.

8. The handheld scanner as claimed in claim 1, further comprising at least one of the following fill-in lamps:
a plurality of first fill-in lamps (51), the plurality of first fill-in lamps (51) being arranged around the first black-and-white camera (21);
a plurality of second fill-in lamps (52), the plurality of second fill-in lamps (52) being arranged around the second black-and-white camera (22);
a plurality of third fill-in lamps (53), the plurality of third fill-in lamps (53) being arranged around the texture camera (10).

9. The handheld scanner as claimed in claim 1, further comprising:
a third black-and-white camera (23), wherein the third black-and-white camera (23) being spaced apart from the first black-and-white camera (21) and the second black-and-white camera (22).

10. A scanning method for the handheld scanner, wherein the scanning method is applied to the handheld scanner according to claim 1, and the scanning method comprising:
employing the laser projector (30) to project laser light onto a surface of an object to be measured, and synchronously acquiring laser light patterns modulated by the surface of the object to be measured by using the first black-and-white camera (21) and the second black-and-white camera (22), wherein the laser light patterns are configured to perform three-dimensional reconstruction on the object to be measured;
stop employing the laser projector (30) to project laser light onto the surface of the object to be measured, and acquiring a texture image of the surface of the object to be measured by using the texture camera (10), wherein the texture image is configured to perform texture reconstruction on the object to be measured;
performing point cloud reconstruction on the laser light patterns acquired by the first black-and-white camera (21) and the second black-and-white camera (22) based on the internal parameters and the external parameters of the first black-and-white camera (21) and the second black-and-white camera (22), and mapping the point cloud by using the texture image to obtain a final three-dimensional scanned image;
wherein a time interval between acquiring the laser light patterns and acquiring the texture image is lower than a preset threshold via a circuit design in the handheld scanner.

11. The scanning method as claimed in claim 10, wherein mapping the point cloud by using the texture image to obtain the final three-dimensional scanned image comprises:
determining a correspondence relationship between each pixel in the texture image and each point in the point cloud based on the internal parameters and the external parameters of the first black-and-white camera (21), the second black-and-white camera (22), and the texture camera (10);
mapping the point cloud to determine the final three-dimensional scanned image based on the correspondence relationship between each pixel in the texture image and each point in the point cloud.

12. The scanning method as claimed in claim 11, wherein determining the correspondence relationship between each pixel in the texture image and each point in the point cloud based on the internal parameters and the external parameters of the first black-and-white camera (21), the second black-and-white camera (22), and the texture camera (10) comprises:
determining a correspondence relationship between the laser light patterns acquired by the first black-and-white camera (21) and the second black-and-white camera (22) and each pixel in the texture image acquired by the texture camera (10) based on the internal parameters and the external parameters of the first black-and-white camera (21), the second black-and-white camera (22) and the texture camera (10);
determining the correspondence relationship between each pixel in the texture image and each point in the point cloud based on the correspondence relationship between the laser light patterns and each pixel in the texture image and the correspondence relationship between each pixel in the laser light patterns and each point in the point cloud.

13. The scanning method as claimed in claim 11, wherein mapping the point cloud to determine the final three-dimensional scanned image based on the correspondence relationship between each pixel in the texture image and each point in the point cloud comprises:
   splicing the point cloud of a current frame with the point cloud of a previous frame, and determining a first region of the point cloud of the current frame and a map image of the first region based on the texture information about the texture image corresponding to the point cloud of the current frame and the texture information about the texture image corresponding to the point cloud of the previous frame;
   processing the point cloud of all frames based on the above steps to obtain the final three-dimensional scanned image.

14. The scanning method as claimed in claim 13, wherein determining the first region of the point cloud of the current frame and the map image of the first region based on the texture information about the texture image corresponding to the point cloud of the current frame and the texture information about the texture image corresponding to the point cloud of the previous frame comprises:
   determining the first region of the point cloud of the current frame based on the grayscale changes in the texture image corresponding to the point cloud of the current frame and the texture image corresponding to the point cloud of the previous frame, wherein the grayscale change in the first region satisfies preset conditions;
   comparing a plurality of texture images corresponding to the first region of the point cloud of the current frame to determine a target texture image obtained by performing front-view shooting on the corresponding position of the object to be measured in the first region;
   mapping the first region by using the target texture image to determine the map image of the first region.

\* \* \* \* \*